W. M. MACKINTOSH.
METHOD OF VULCANIZING RUBBER.
APPLICATION FILED AUG. 6, 1920.
1,400,618. Patented Dec. 20, 1921.
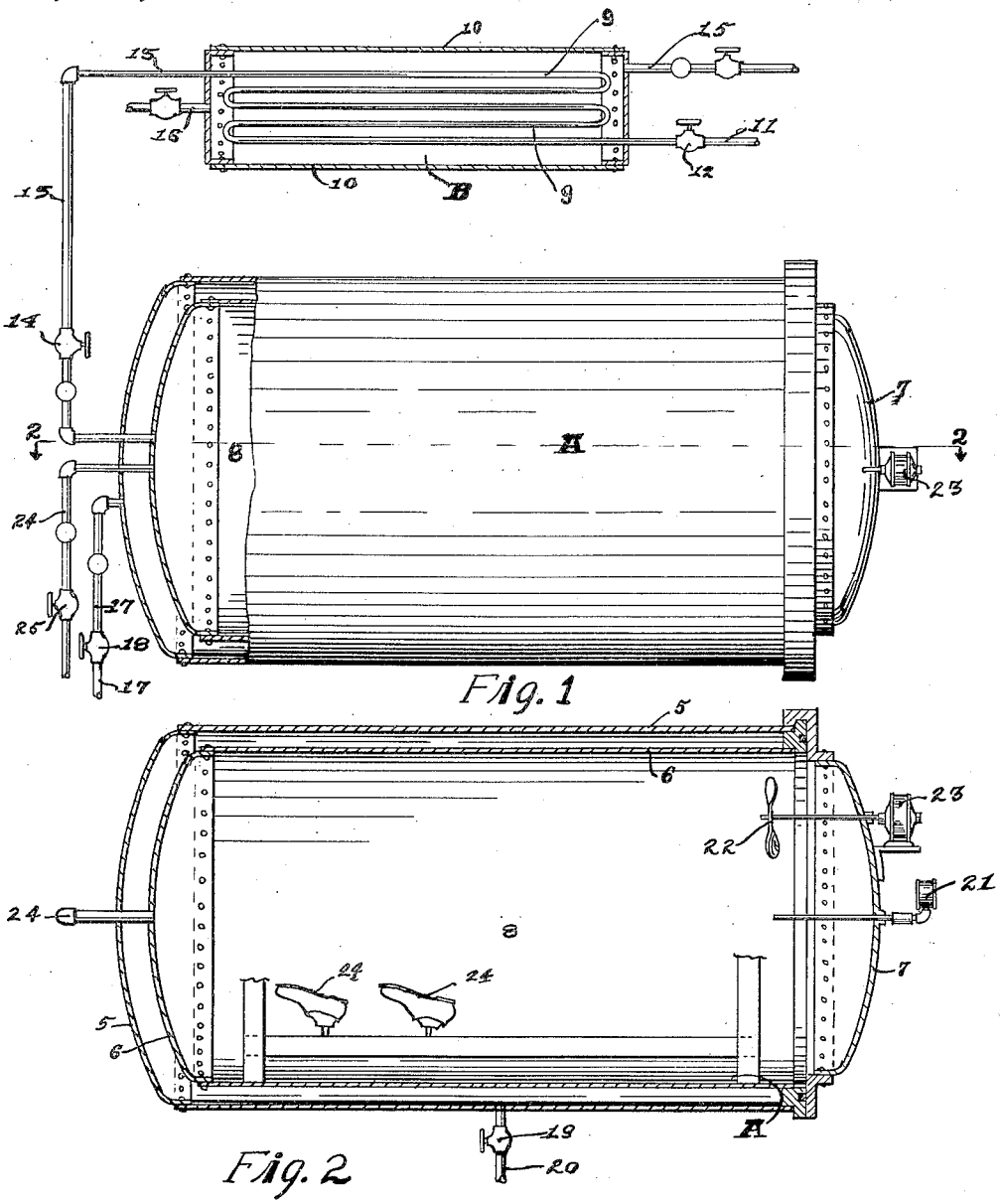
William M. Mackintosh
Inventor
By F. E. Sherman
Attorney

UNITED STATES PATENT OFFICE.

WILLIAM M. MACKINTOSH, OF SPRINGFIELD TOWNSHIP, SUMMIT COUNTY, OHIO, ASSIGNOR TO THE KELLY-SPRINGFIELD TIRE COMPANY, OF AKRON, OHIO, A CORPORATION OF NEW JERSEY.

METHOD OF VULCANIZING RUBBER.

1,400,618.  Specification of Letters Patent.  Patented Dec. 20, 1921.

Application filed August 6, 1920. Serial No. 401,617.

*To all whom it may concern:*

Be it known that I, WILLIAM M. MACKINTOSH, a citizen of the United Kingdom of Great Britain and Ireland, residing at Springfield township, in the county of Summit and State of Ohio, have invented new and useful Improvements in Methods of Vulcanizing Rubber, of which the following is a specification.

This invention pertains to a new and useful improvement in the art of vulcanizing rubber and has particular relation to an improved method of vulcanizing rubber shoes or the like, wherein a highly glossed surface is necessary or desirable.

Objects of the invention are to provide a new and useful method whereby articles composed in whole or in part of rubber and particularly varnished articles may be conveniently and expeditiously cured, and to provide a method by which such articles may be cured under pressure in a relatively short period of time and which will be more economical and produce a more durable, attractive product than can be produced by the methods heretofore known.

In following the ordinary methods of curing, a considerable proportion of such articles are blistered during vulcanization and are thus rendered imperfect and unfit for sale.

It is therefore an additional purpose to provide a method of vulcanization by which such articles may be thoroughly cured without blistering and which will produce a strong, compact, uniform product.

The above and additional objects are accomplished by the method herein described with reference to the accompanying drawing which forms a part hereof and in which I have illustrated ordinary instrumentalities for carrying out my improved method, it being understood that the invention is capable of various adaptations and that changes, variations and modifications may be resorted to which come within the scope of the claims hereunto appended.

In the accompanying drawing illustrating apparatus used in connection with my improved method, Figure 1 is a plan view of a vulcanizing kettle having portions broken away and showing an air heater operatively connected thereto, and, Fig. 2 is a longitudinal, sectional view of said kettle taken as indicated by the lines 2—2 of Fig. 1.

Proceeding now to a detailed description of the apparatus employed, the kettle A has an outer wall 5 and an inner wall 6 which are spaced apart to form a steam jacket, and a lid 7 is provided to close the chamber 8 in said kettle. The air heater, denoted in the drawings by the letter B, comprises a pipe coil 9 having a casing or jacket 10 therearound. A pipe 11 having a valve 12 leads into the coil 9 from a compressed air reservoir (not shown) and a pipe 13 having a valve 14 leads from said coil 9 to the chamber 8 in the kettle A. The coil jacket 10 is provided with a steam inlet pipe 15 and an outlet pipe 16 and in operation, the inlet pipe is connected to a steam supply and suitable valves in the inlet and outlet pipes are regulated so that the coil 9 is highly heated by the steam in the jacket 10. A pipe 17 provided with a valve 18 leads from a source of steam supply into the jacket around the chamber 8. An outlet pipe or drain 20, having a valve 19 is also provided; and the valves 18 and 19 are regulated to fill the cavity between the walls 5 and 6 with steam so that a vulcanizing temperature may be constantly maintained in the chamber 8.

The capacity of the coil 9 is such that it will contain a sufficient quantity of air to fill the chamber 8 with air under pressure. The lid 7 is provided with a thermometer 21 which is positioned thereon so as to extend into the chamber 8 and a fan 22 is also secured to said lid in a suitable position to agitate the air in said chamber 8. The fan being operated by suitable means, such as the motor 23, leads from a source of steam supply directly into the chamber 8.

In carrying out my improved method, steam is admitted to the jacket 10 around the coil 9 and to the jacket around the chamber 8 as hereinbefore set forth. The valve 14 is then closed and the valve 12 is opened and a sufficient quantity of air to fill the chamber is forced into the coil 9. Rubber articles such as the shoes 24 which have been built upon a last or otherwise preformed are then placed in the chamber and the lid 7 is secured thereon. The valve 14 is then opened and the air in the coil 9 is forced into the chamber 8 under pressure at the desired vulcanizing temperature and said temperature is constantly maintained by the steam in the jacket around said chamber. The valve 14 is then closed and the valve 25 is opened and a sufficient quantity of steam is admitted to the chamber 8 through the pipe 24 to render the air in said chamber a better conductor of heat, whereupon the valve 25 is closed. The fan 22 is then operated and the steam moistened air in said chamber is constantly agitated thereby during vulcanization. The articles are allowed to remain in said chamber for a sufficient period of time to secure the desired degree of vulcanization, the period required depending upon the nature of the article and the nature of the compound used in the construction thereof.

In use, I have found that while a varnished article cannot be vulcanized in a chamber filled with steam without destroying its luster, that by following the method herein described all the benefits of the steam cure are obtained without its many disadvantages and that highly varnished articles may be properly vulcanized in a short period of time without loss of luster.

Having thus described my invention what I claim as new and desire to secure by Letters-Patent is:—

1. The process of vulcanizing articles composed wholly or in part of rubber which consists in confining the article within an inclosed space; heating air to a vulcanizing temperature; forcing the air so heated into said space under pressure; introducing a sufficient quantity of steam into said space to increase the heat conductive properties of said air; agitating the air so confined and maintaining the pressure and temperature thereof for a period of time sufficient to insure vulcanization.

2. That method of vulcanizing preformed articles composed wholly or in part of rubber which consists in confining the article within a heated chamber; heating air under pressure to a vulcanizing temperature; forcing the air so heated into said chamber, under pressure; increasing the heat conductive properties of said air by introducing a quantity of steam into said chamber; continuously agitating the said air and maintaining the pressure and temperature thereof for a period of time sufficient to secure the desired degree of vulcanization.

3. That method of vulcanizing articles composed wholly or in part of rubber which comprises, confining the article within a heated chamber, heating compressed air to a vulcanizing temperature, introducing the air, under pressure, into said chamber, forcing a relatively small proportion of heated vapor into said chamber, creating a continuous forced circulation of the air within said chamber and maintaining the temperature thereof during a period necessary to vulcanize said article.

4. That method of vulcanizing articles composed in whole or in part of rubber consisting in confining the article within an inclosed space; heating air to a vulcanizing temperature forcing said air under pressure into said space, moistening the same with heated vapor; creating a continuous circulation of said air within said space and maintaining the same at a vulcanizing temperature for a period of time necessary to properly cure said article.

In testimony whereof I have hereunto set my hand.

WILLIAM M. MACKINTOSH.